April 21, 1925.

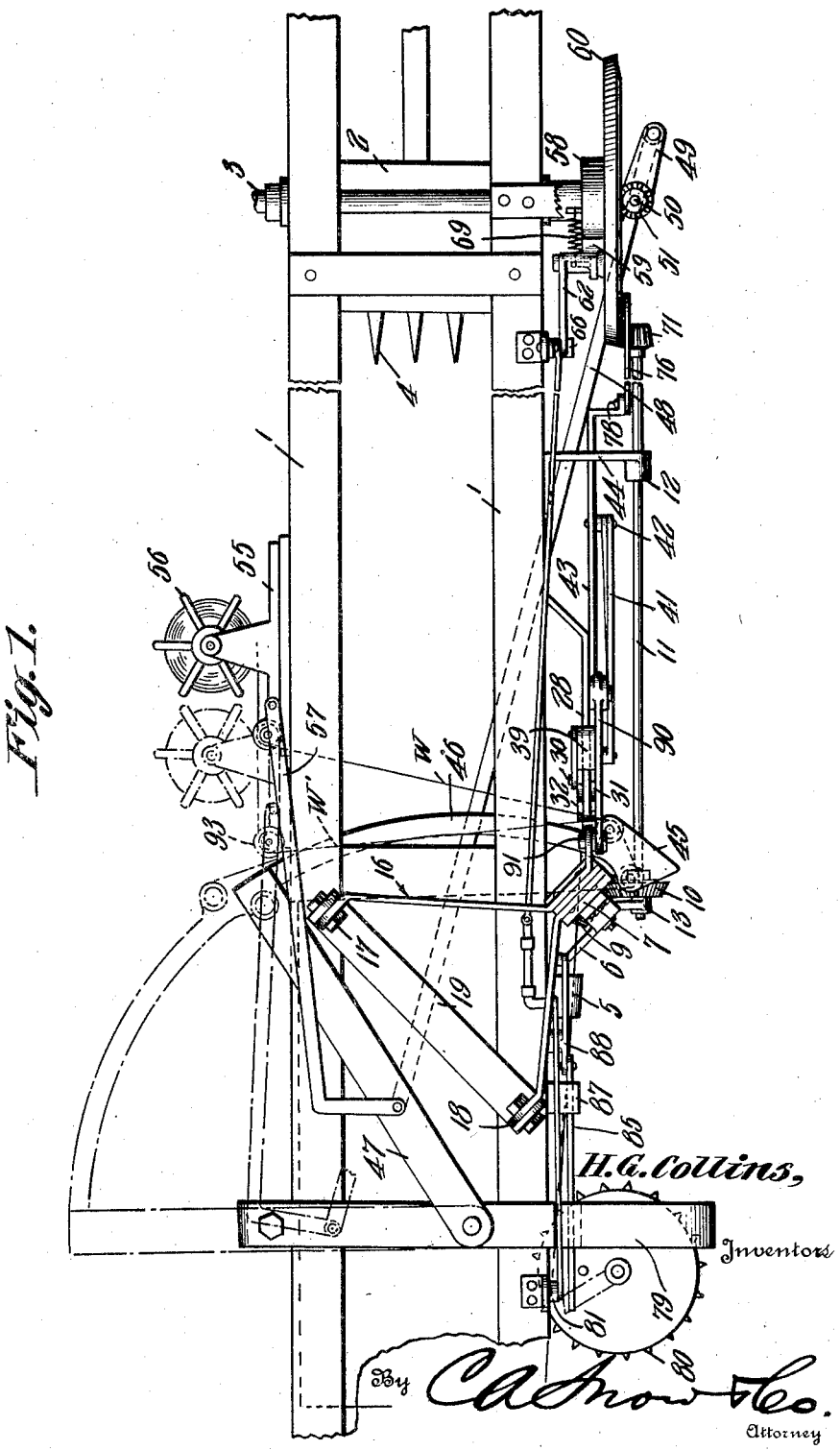

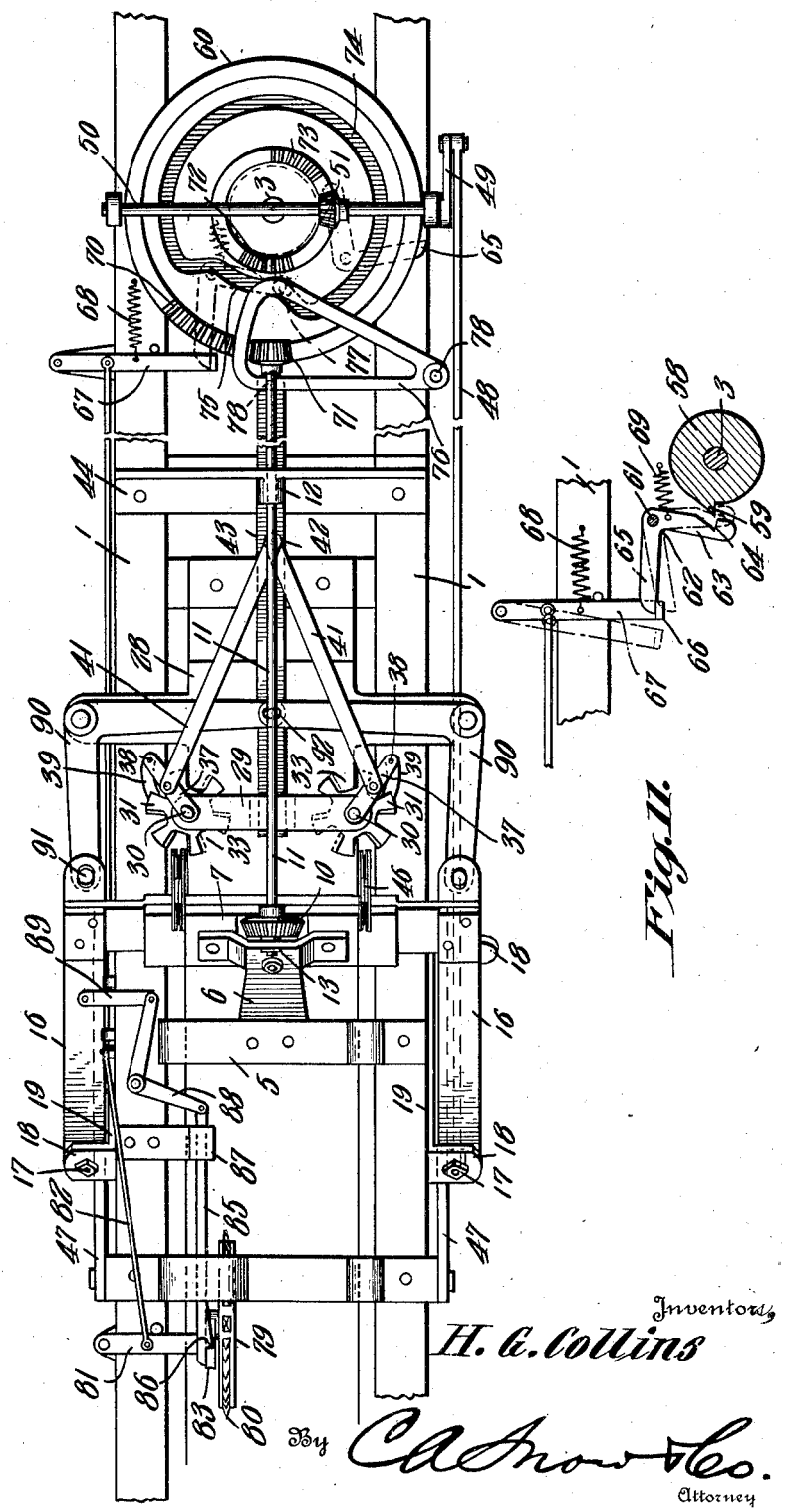

H. G. COLLINS

BALING MACHINE

Filed Jan. 12, 1924

Inventor,
H. G. Collins
By *[signature]*
Attorneys

April 21, 1925. 1,534,359
H. G. COLLINS
BALING MACHINE
Filed Jan. 12, 1924 5 Sheets-Sheet 4
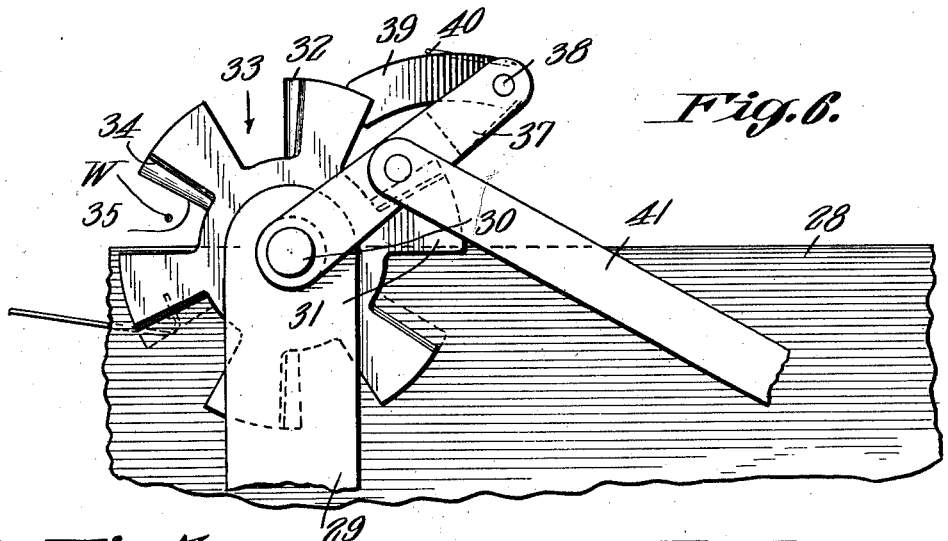
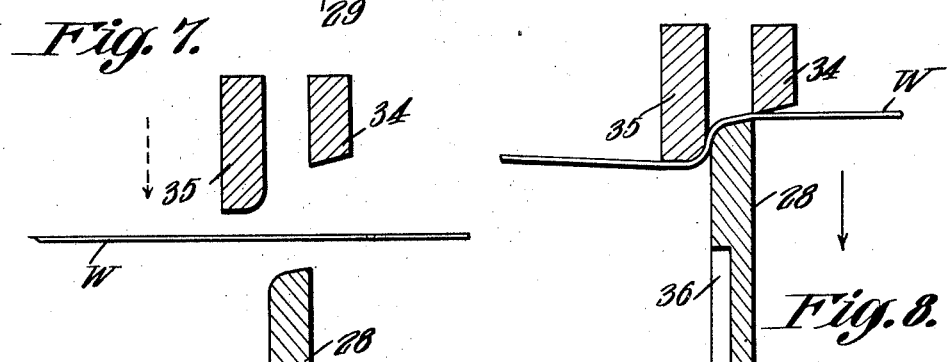
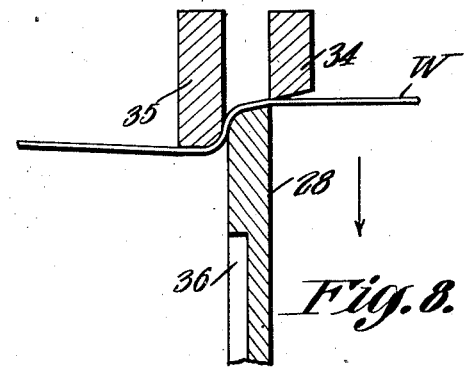
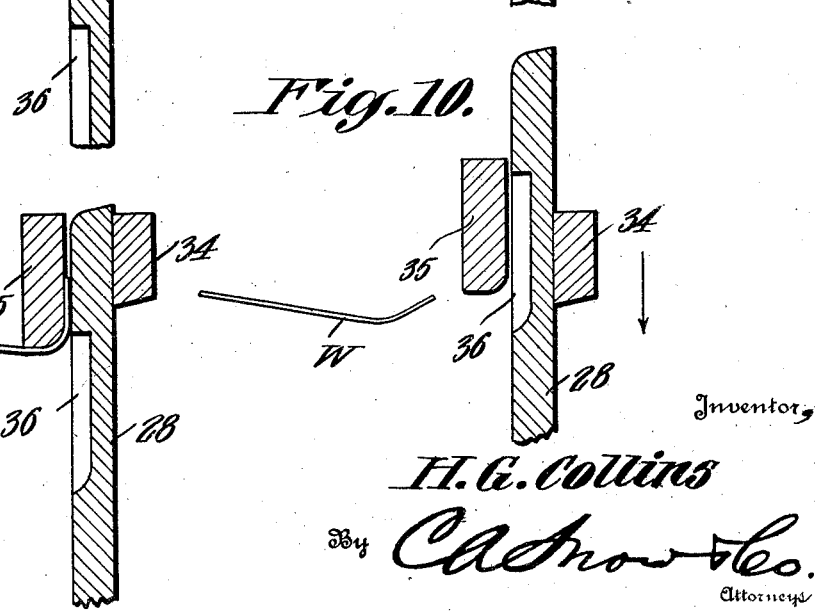
Inventor
H. G. Collins
By C. A. Snow & Co.
Attorneys April 21, 1925. 1,534,359
H. G. COLLINS
BALING MACHINE
Filed Jan. 12, 1924. 5 Sheets-Sheet 5

Inventor
H.G.Collins
By C.A.Snow & Co.
Attorneys

Patented Apr. 21, 1925.

1,534,359

UNITED STATES PATENT OFFICE.

HENRY GERARD COLLINS, OF WILLIAMSBURG, KANSAS.

BALING MACHINE.

Application filed January 12, 1924. Serial No. 685,842.

*To all whom it may concern:*

Be it known that I, HENRY G. COLLINS, a citizen of the United States, residing at Williamsburg, in the county of Franklin and State of Kansas, have invented a new and useful Baling Machine, of which the following is a specification.

This invention relates to baling presses and more particularly to means whereby the wires used in binding the bales are twisted together and severed, the operation being automatic and in properly timed relation to the compression of the bale.

A further object is to provide twisting gears of novel construction operating automatically to twist the wires fed thereto and subsequently to release them.

Another object is to provide novel mechanism under the control of the bale for automatically resetting the mechanism after the completion of each bale.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a plan view of the mechanism constituting the present invention.

Fig. 2 is a side elevation thereof.

Fig. 6 is an elevation of one of the cutters and its operating means.

Fig. 7 is a view showing in diagram the relative positions of the parts of the cutter when the wire is first fed thereto by the needle.

Fig. 8 is a similar view showing the next stage in the operation of the cutter.

Fig. 9 is a view showing the third stage of the operation of the cutter.

Fig. 10 is a similar view showing the fourth stage of the operation of the cutter.

Fig. 11 is a view partly in elevation and partly in section of the means employed for coupling the controlling cam to and uncoupling it from its drive shaft.

Figure 4:
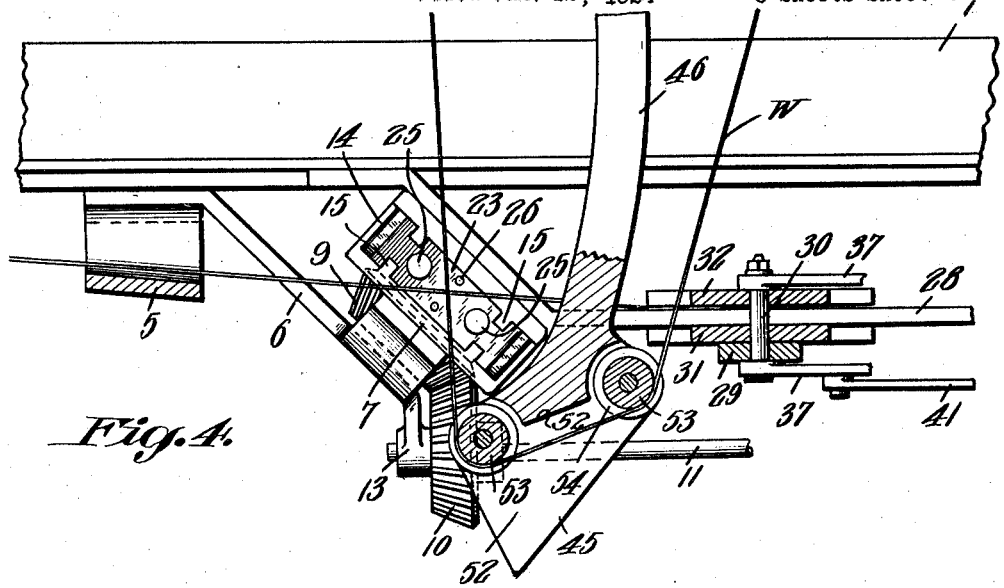
Fig. 4 is a horizontal section showing the relative positions of the needle, twisting gear and cutter immediately prior to the severing and twisting operation.

Referring to the figures by characters of reference 1 designates the frame of the baling press. This press can be of any preferred construction and utilizes a reciprocating plunger 2 adapted to be operated by the rotation of a transverse drive shaft 3 on the frame 1. As the means for operating the plunger does not constitute any part of the present invention, it has not been deemed necessary to show a driving connection between the shaft 3 and the plunger. It is sufficient to state that during each complete rotation of the shaft 3 the plunger 2 makes one complete forward and backward movement within the press. If preferred this plunger may be provided with short spikes 4 extending from the front or active face thereof so that each time the material is placed under compression by the plunger, the spikes will perforate the compressed material. Consequently when the bale is completed the series of perforations will aline and form ventilating openings through the formed bale. Thus danger of spontaneous combustion in the bale due to heat generated by the baling of wet or green material will be considerably lessened.

Mounted on one side of the frame 1 is a cross member 5 to which is secured a laterally extending obliquely disposed plate 6, the outer end of which is secured to a block 7. In this block is journaled an intermediate gear 8 on which is provided a beveled gear 9 that constantly meshes with and is adapted to receive motion from a gear 10 secured to and rotating with a longitudinal shaft 11 located at the side of the baling press. This shaft can be mounted in suitable bearings as indicated at 12 and 13. Formed in the ends of the block 7 are semicircular recesses 14 each of which has a semicircular guide rib 15 on each wall thereof.

Hingedly connected to the top and bottom of the frame 1 are yokes 16 the axes of movement of which are preferably obliquely disposed as shown in Fig. 1 wherein the attached ends of the top yoke 16 are pivotally connected at 17 to upstanding ears 18 at the ends of an obliquely disposed strip 19 secured on the frame 1.

Connected to one end of each yoke 16 is a block 20 having a semi-circular recess 21 therein, the side walls of which are provided with semi-circular ribs 22 corresponding with the ribs 15. Thus when the blocks 21 are positioned against the ends of the block 7 the recesses 21 will match the recesses 14 to provide circular compartments with the ribs 22 abutting against the ends of the ribs 15 to provide circular guides.

Mounted for rotation within the recesses 14 and 21 on the blocks 7 and 20 are sectional gears each of which is made up of a semi-circular segment 23 provided in its side faces with semi-circular grooves 24 into which the ribs 15 and 22 project. The segments 23 of each sectional gear are adapted to be spaced apart by lugs 25 formed on one or both of the sections and dowels 26 may be extended from one of the sections of each gear and project into sockets or recesses 27, formed in the opposed section of the gear. Thus when the blocks 7 and 20 are assembled end to end the sections of the gears will be held in proper relation to each other with the result that rotation of gear 8, which meshes with the sectional gears 23 will rotate said sectional gears, the ribs 15 and 22 serving as circular guides or bearings on which the sectional gears revolve.

A supporting plate 28 is extended from the block 7 and is suitably connected to one side of the baling press, this plate being provided with a cross strip 29. Bearing pins 30 are secured in the ends of the strip 29 and in the upper and lower edge portions of the plate 28. Journaled on these pins are spaced disks 31 and 32 between which the plate 28 extends. The disks are formed with annular recesses in the periphery thereof as shown at 33 so as to provide spaced blades on the disks. The blades 34 upon one disk of each pair constitute cutting blades while the blades 35 upon the other disk of each pair constitute gripping blades. Blades 34 are formed with cutting edges as shown while the advancing edges of the blades 35 are preferably rounded as is also that edge of the plate 28 cooperating with the blades 35. Located in one side of plate 28 close to the path of the blades 35 is a wire receiving recess 36 for the purpose hereinafter explained.

Mounted to swing on the pin 30 are links 37 connected at their outer ends by a pin 38 on which is mounted a pawl 39. A spring 40 bears against the pawl and serves to hold it normally in engagement with one blade of each disk. The two links assembled with each pair of disks will obviously swing in unison and pivotally connected to one link of each pair is an actuating link 41. The links 41 of the two pairs of disks converge and are pivotally connected at 42 to a bar 43 slidably mounted in the cross strip 29 and in a cross strip 44 carrying the bearing 12. Thus when the bar 43 is slid in one direction the two pairs of disks will be rotated by their pawls a distance approximately equal to the distance between two adjoining blades of each disk and when the bar is moved in the opposite directions the pawls will be reset ready to again impart a short rotation to the disks.

The block 7 is spaced from the disks 31 and 32 a sufficient distance to receive between them the spear-shaped head 45 of an arcuate needle 46. One of these needles is provided for insertion between each end of block 7 and the adjacent pair of disks 31 and 32. Each needle is fixedly connected to and extends from a frame 47 straddling and pivotally mounted on the baling press and an actuating pitman 48 is pivotally connected to the frame and also to a crank arm 48 extending from a vertical shaft 50 on which is secured a gear 51.

The free end of each needle has a wire receiving groove or slot 52 extending thereacross and journaled in the end portions of the slot are guide wheels 53 having grooved peripheries 54 for the reception of the wire W. Normally the head of each needle is located at one side of the baling press outside of the baling chamber as indicated by broken lines in Fig. 1. A slide 55 is mounted on one side of the baling press and carries a reel 56 on which a supply of wire is coiled. A link 57 connects this slide to the pivoted frame 47 so that when the needle is in normal position as indicated by broken lines in Fig. 1, the slide 55 and the reel are positioned nearer the pivot of the frame 47, than when the needle is extended across the baling chamber as shown by full lines in Fig. 1. Thus under normal conditions the strand of wire extending from the reel in its dotted position in Fig. 1 is out of the path of any packing element that might be used for feeding material into the path of the plunger 2.

Fixed on the shaft 3 is a collar 58 having a tooth or projection 59 on its periphery. A disk 60 is loosely mounted on the shaft 3 and bears against one face of the collar. Depending from this disk is a pivot pin 61 on which is loosely mounted a bell crank 63, one arm 63 of which has a notch 64 into which the tooth or projection 59 is adapted to engage. The other arm 65 of the bell crank is adapted normally to rest on a finger 66 extending laterally from a holding lever 67, there being a spring 68 for swinging the lever 67 normally in position to engage and support arm 65. Another spring 69 connects the arm 63 to disk 60 and serves to shift said arm into engagement with collar 58 when the holding lever 67 is disengaged from arm 65.

Disk 60 is provided with a segmental gear 70 designed, once during each rotation of the disk 60, to engage and rotate a gear 71 secured to the shaft 11. Spaced segmental gears 72 and 73 are also formed on the disk 60 and are adapted, during one rotation of disk 60, to successively engage and rotate the gear 51.

Formed in disk 60 is a cam groove 74 the greater portion of which is concentric with the shaft 3 while a portion thereof is offset inwardly toward the shaft as shown at 75.

Pivotally connected to the frame of the baling press or upon any suitable structure attached thereto is a lever 76 having a stud 77 projecting into the groove 74. Thus the lever is pivotally connected to the bar 43 as shown at 78.

Figure 12:
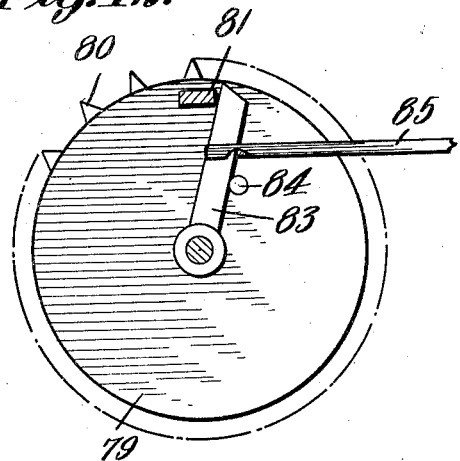
Fig. 12 is an enlarged horizontal section showing the bale operated wheel in plan and also showing a portion of the resetting mechanism, the parts being shown in the relative positions reached thereby immediately prior to the actuation of the resetting mechanism.
Figure 13:
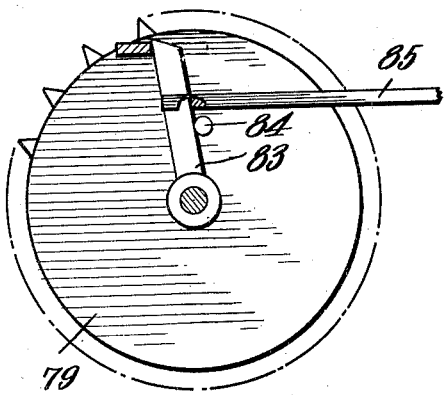
Fig. 13 is a similar view showing the relative positions of the parts after the actuation of the resetting mechanism, the position of the tripping lever after being disengaged from the depending lever of the resetting mechanism being indicated by broken lines.
Figure 14:
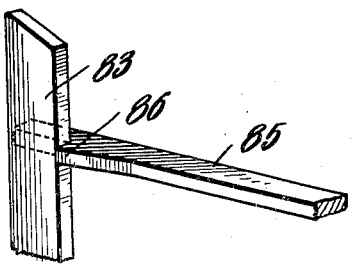
Fig. 14 is a perspective view of a portion of the tripping lever and its thrust bar.

Journaled at one side of the frame 1 is a wheel 79 having prongs 80 radiating from its periphery and adapted to be engaged and shifted by material being compressed into a bale, it being understood that these prongs project slightly into the baling chamber. A releasing lever 81 is pivotally mounted above and extends downwardly close to the wheel 79 and is connected by a rod 82 to the lever 69. Pivotally mounted on the middle portion of the wheel 79 is a tripping lever 83 lying in the path of a pin 84 extending from the wheel. A thrust bar 85 is slidable on lever 83 and has a shoulder 86 adapted to bear against said lever as shown in Figs. 12, 13 and 14. Thus the thrust bar is slidable within a suitable guide 87 and is pivotally connected to one arm of a bell crank 88. The other arm of the bell crank is connected by a link 89 to one of the yokes 6.

Pivotally mounted above and below the plate 28 are bell cranks 90, one arm of each bell crank being pivotally connected as at 91 to one of the yokes 16. The other arm of each bell crank is pivotally connected to the bar 43 as shown at 92.

In operation the needles and reels are normally located as indicated by broken lines in Fig. 1. One end of each wire W is gripped between plate 29 and one of the blades 35 as shown in Fig. 9 while the next adjoining blades 34 are spaced from the edge of the plate 28 as shown in Fig. 7. The wire W is extended from the gripped end thereof directly across the baling chamber as shown at W' in Fig. 1 and extends to the reel over a guide wheel 93 carried by the slide 55. The material to be baled is packed into the path of the plunger 2 and each time the plunger moves forward it compresses the material within the baling chamber, forcing it against that portion of the wire in the path thereof and this operation is continued until the compressed material is in bale form within the press with the wire W extending along two sides and across one end thereof. During this formation of the bale the wheel 79 will be gradually rotated by the material being compressed and the parts are so proportioned that when a bale of the proper size has been produced the pin 84 will come against tripping lever 83 and force it against releasing lever 81 moving it out of its normal position. A slight movement of lever 81 will result in the transmission of motion through rod 82 to holding lever 67. Thus finger 66 will be withdrawn from arm 65 as shown by broken lines in Fig. 11 and the bell crank 62 will snap into engagement with collar 58. Shaft 3 continuously rotates and, therefore, the tooth 59 will come into the notch 64 so that disk 60 will thus be coupled to collar 58 and shaft 3 and caused to rotate therewith.

Figure 3:
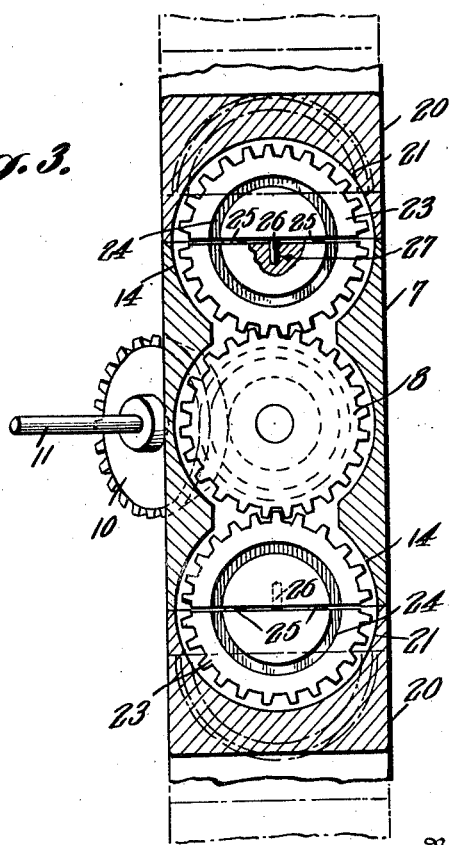
Fig. 3 is a section through the housings of the gears of the twisting mechanism, the gears being shown in elevation.
Figure 5:
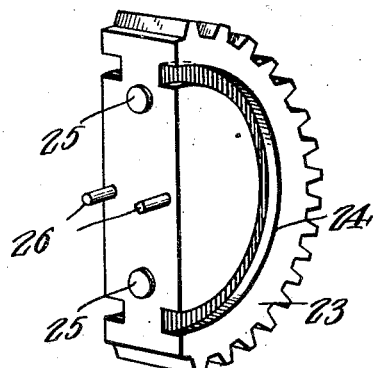
Fig. 5 is a perspective view of one of the segments of the twisting gear.
Figure 16:
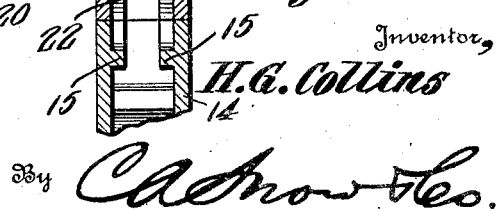
Fig. 16 is a transverse section through the meeting portions of two of the gear holding blocks.

During the first portion of the rotation of disk 60 the gear 73 will come into engagement with and rotate with the gear 51, thereby causing the rod 48 to swing frame 41 and move the needles across the baling chamber and back of the bale. During this movement the groove or slot in each needle will receive one of the wires W which will thus be engaged by the rollers 53 and formed into a loop that will be carried across the baling chamber. In the formation of the bale that portion of the wire extending from the gripping disk 32 is stretched across the gear section 23 contained in the block 7 and when the needle 48 is brought across the back of the bale to the position shown in Fig. 4, a loop is formed in the wire that extends across the baling chamber with one side of the loop extending across the gear section 23 in block 7 and the other side of the loop extending between the blades 34 and 35 spaced from the one nearest to the plate 28. This has been clearly shown in Figs. 4 and 6. As soon as the needle reaches this position the stud 77 enters the offset portion 75 of the cam groove 74 with the result that bar 43 is drawn longitudinally. This produces two operations. First, the links 41 pull through the links 37 so as to draw the pawls 39 back to set positions. Second, the bar 43 pulls on the bell cranks 90 and causes the yokes 16 to swing toward each other. This causes the blocks 20 to clamp on the ends of the block 7 and brings together the gear sections in the block 7 and the blocks 20 as shown in Fig. 3. Thus the crossed portions of the wires become positioned between the dowels 26 and the spacing studs 25. Further rotation of disk 60 brings segmental gear 70 into mesh with gear 71 so that shaft 11 and gear 10 are rotated. This effects the rotation of gear 8 and the sectional gears 23 with the result that those portions of the wires held between the segments of the sectional gears will be rapidly twisted together. During the completion of this twisting operation the stud 77 comes in the other end of the offset portion 75 of cam groove 74, so that lever 67 is thrust into the opposite direction pushing bar 43 away from shaft 3. Thus the movement of the bell cranks 70 is reversed and yokes 16 are swung away from each other, carrying with them the blocks 20 and those gear sections 23 mounted in the blocks. The dowels 26 are withdrawn from the twisted portions of the wires. During this motion the links 41 thrust the pawls 39 against engaged blades of the disks 31 and 32 and said disks are simultaneously rotated one step. Thus that end of the wire that had previously been held as shown in Fig. 9 will be brought into the groove 38 and released as shown in Fig. 10. At the same time baling blade 35 will came against the wire W and bend it downwardly onto one face of plate 28, as shown in Fig. 8, while the adjoining blade 34 will shear off the wire as shown in Fig. 8. On the completion of this movement of the disks, the blades will assume the positions shown in Fig. 9, one of the blades holding one end of that length of wire extending to the reel while the blade 34 has severed that portion of the wire attached to the finished bale. Immediately following this operation the gear 72 comes into engagement with gear 51 and actuates the needles so as to swing them back to their normal positions indicated by broken lines in Fig. 1. Thus the formation of the bale is completed, it being understood that the actuation of the needle, and the twisting and severing of the wire all takes place between two successive forward strokes of the plunger 2, or, in other words, during one complete rotation of the shaft 3 and disk 60.

As it is essential to promptly release lever 67 following the coupling together of the parts 58 and 60 so that only one rotation of disk 60 can take place at one time, there has been provided a releasing mechanism illustrated particularly in Figs. 12, 13 and 14.

As soon as lever 83 shifts lever 81 and before it is clear thereof the parts 58 and 60 become coupled together and unless some means is provided for releasing lever 81, automatic uncoupling of the parts would not be affected.

For this purpose the bar 83 has been provided and when the yokes 16 are swung toward each other during the first movement of the bar 43, the bell crank 88 will thrust bar 85 longitudinally so that its shoulder 86 will press against lever 83 and uncouple it from lever 81. Consequently lever 67 will be free to swing back to its normal position so that during the completion of one revolution of disk 60 the arm 65 of bell crank 62 will come against finger 66 so as to uncouple arm 63 from the tooth or projection 59.

Figure 15:
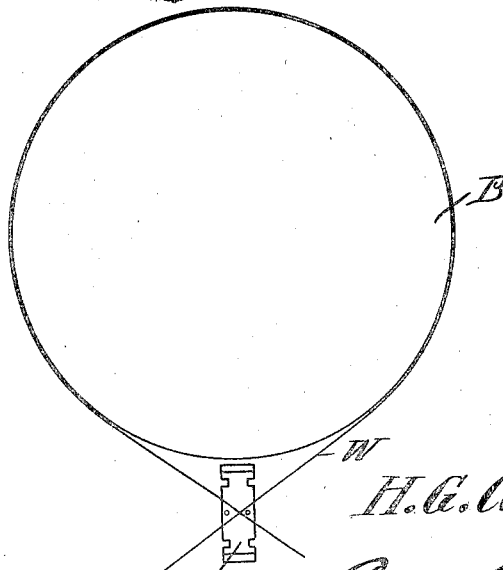
Fig. 15 is a view showing in diagram the relative positions of the twisting gear and wire when used in the formation of a round bale.

When a baling press is used for the purpose of producing round bales the twisting gears can be disposed in planes radiating from the center of the formed bale as shown in diagram in Fig. 15 wherein the round bale has been indicated at B, the wire at W and one of the segments of the sectional gear at 94.

It will be understood that when the needles are swung across the baling chamber the slide 55 is shifted away from them to the position shown by full lines in Fig. 1, thus insuring the proper positioning of one side of the wire loop between the blades of the clamping and cutting disks.

While the twisting mechanism herein described is especially useful in connection with baling presses, it is to be understood that it can be used with equal efficiency upon any type of machine where it is desirable to twist wires together.

What is claimed is:—

1. In a baling press the combination with sectional gears, of means operating in timed relation for bringing together the segments of each gear and rotating said gears.

2. In a baling press the combination with sectional gears each including separate segments, of means for holding each segment, a bearing within each holding means rotatably engaged by the segment, means for bringing the segments of each gear together, and means for rotating the segments upon their bearings and within the holding means.

3. In a baling press the combination with sectional gears each including separate segments, of means for holding each segment, a bearing within each holding means rotatably engaged by the segment, means for moving the segments of each gear towards each other, spacing means carried by one of the segments, holding means extending from one segment of each gear into the other segment of said gear, and means for rotating the segments of each gear upon their bearings.

4. In a baling press the combination with a sectional gear including normally spaced segments, means for holding each of the segments, and bearings within the holding means for the segments, of means for positioning a wire between the segments, means for moving the segments together with the wire between them, and means for rotating the gears formed of the contacting segments within the holding means.

5. In a baling press the combination with normally spaced holding means and a sectional gear comprising separate segments within the respective holding means, of means for positioning the opposed portions of a wire loop between the sections of the gear, means for moving the holding means toward each other to bring the gear sections together with the wire between them, and means for rotating the sectional gear within the holding means to twist the wire.

6. In a baling press the combination with normally spaced holding means of a sectional gear having separate segments mounted within the respective holding means, means for positioning offset portions of a wire loop between the sections of the gear, portions on the sections of each gear adapted to interfit when the sections are brought together, means for moving the holding means toward each other to bring the gear sections together with the wire between them, and means for rotating the sectional gear within the holding means to twist the wire.

7. The combination with nomally spaced holding means and a sectional gear having separate segments movably mounted within the respective holding means, of spaced disks, gripping and severing blades extending from the respective disks, stationary means cooperating with the blades on the disks for gripping and severing a wire, means for directing a wire loop with one portion between the sections of the gear and another portion between the blades on the disks, and separate means operating in timed relation for successively bringing the gear segments together, rotating said segments to twist the wire therebetween, and shifting the disks to sever the wire and to grip one end thereof between a gripping blade and the stationary gripping means cooperating therewith.

8. In a baling press the combination with normally spaced segments of a sectional gear, a stationary member, and disks mounted for rotation in unison and having gripping and cutting blades extending from the respective disks, of means for directing a wire loop between the gear and disks to position one side of the loop between the gear segments and the other side of the loop between the plates on the respective disks, and means operating in timed relation for successively bringing together the segments of the gear, rotating the gear and actuating the disks to sever one side of the wire loop and grip the wire between one of the blades and the stantionary means.

9. In a baling press the combination with a stationary block having a recess thereof and a gear, of a yoke mounted to swing relative to the stationary block, a movable block carried by the yoke, a sectional gear having one segment mounted for rotation in each block, the segment in the stationary block being in mesh with the first named gear, means for swinging the yoke for bringing the blocks together and the gear segments in contact, and means for rotating the first named gear to actuate the sectional gear within the abutting blocks.

10. In a baling press the combination with a stationary holding means, of a yoke, a movable holding means carried thereby, a sectional gear having separate segments movably mounted in the respective holding means, means upon the segments for interfitting when the segments are brought together, means for moving the holding means toward each other to bring the segments together, and means for rotating the segments within the holding means when brought together.

11. In a baling press, the combination with twisting means, of a recessed stationary member, disks mounted for rotation relative thereto, gripping blades extending from one of the disks, cutting blades extending from the other disk, all of said blades cooperating with the stationary member, means for looping a wire between the twisting means and blades, means for shifting a portion of the looped wire into the paths of the blades, and means for simultaneously actuating the disks to simultaneously grip a portion of the loop between a gripping blade and the stationary member, sever a portion of the loop upon the stationary member and thereafter bring the gripped portion of the loop opposite the recess in the stationary member to release the gripped portion of the wire.

12. In a machine of the class described, twisting mechanism including a recessed block, a movable structure, a recessed block carried thereby, semi-circular guide means within the recess in each block, a semi-circular gear section within each recessed groove for the reception of the rib, said blocks being movable together to bring the gear sections into contact, and means for rotating the contacting sections to twist a wire held between the sections.

In testimony that I claim the foregoing as my own, I have hereto affixed my signature in the presence of two witnesses.

HENRY GERARD COLLINS.

Witnesses:
M. J. McMANUS,
CHAS. McGINTY.